United States Patent
Johansson

(10) Patent No.: US 12,488,949 B2
(45) Date of Patent: Dec. 2, 2025

(54) CONTACTOR MONITORING

(71) Applicant: ABB Schweiz AG, Baden (CH)

(72) Inventor: Gunnar Johansson, Västerås (SE)

(73) Assignee: ABB Schweiz AG, Baden (CH)

( * ) Notice: Subject to any disclaimer, the term of this patent is extended or adjusted under 35 U.S.C. 154(b) by 416 days.

(21) Appl. No.: 18/063,833

(22) Filed: Dec. 9, 2022

(65) Prior Publication Data
US 2023/0197367 A1  Jun. 22, 2023

(30) Foreign Application Priority Data
Dec. 16, 2021 (EP) .................................. 21215257

(51) Int. Cl.
*H01H 3/28* (2006.01)
*H01H 1/00* (2006.01)
*H01H 3/38* (2006.01)
H01H 71/04 (2006.01)

(52) U.S. Cl.
CPC ............ *H01H 3/28* (2013.01); *H01H 1/0015* (2013.01); *H01H 3/38* (2013.01); *H01H 2071/044* (2013.01)

(58) Field of Classification Search
CPC .............................. H01H 3/28; H01H 11/0062
See application file for complete search history.

(56) References Cited

U.S. PATENT DOCUMENTS

| | | |
|---|---|---|
| 2004/0223283 A1 | 11/2004 | Hsin |
| 2008/0266733 A1 | 10/2008 | O'Leary et al. |
| 2015/0096874 A1 | 4/2015 | Dedina |
| 2019/0078945 A1 | 3/2019 | Chijioke et al. |

FOREIGN PATENT DOCUMENTS

| | | | |
|---|---|---|---|
| CN | 203259286 U | 10/2013 | |
| CN | 103604544 A | 2/2014 | |
| CN | 106531562 | * 3/2017 | |
| DE | 102008046374 B3 | 12/2009 | |
| DE | 102013219864 A1 | 4/2015 | |
| EP | 2320443 B1 | 4/2016 | |
| FR | 2952222 A1 | 5/2011 | |
| WO | WO-9628835 A1 | * 9/1996 | .............. F16F 1/024 |
| WO | WO-2004057634 A1 | * 7/2004 | ........... H01H 1/0015 |

OTHER PUBLICATIONS

Extended European Search Report; Application No. 21215257.3; Completed: Jun. 1, 2022; Issued: Jun. 14, 2022; 5 Pages.
Chinese Office Action; Application No. 202211574360.3; Completed: Mar. 12, 2025; Issued: Mar. 13, 2025; 9 Pages.

* cited by examiner

*Primary Examiner* — John E Breene
*Assistant Examiner* — Alex T Devito
(74) *Attorney, Agent, or Firm* — Whitmyer IP Group LLC

(57) ABSTRACT

A method of monitoring a contact force between electrical contacts in a mechanical contactor. The method includes receiving, from a force sensor, a signal including information about a base force sensed by the force sensor between a stationary core and a base; determining a magnitude of the contact force based on the received information; and outputting information based on the determined magnitude to an operator.

17 Claims, 2 Drawing Sheets

CONTACTOR MONITORING

TECHNICAL FIELD

The present disclosure relates to a method of monitoring a contact force between a pair of electrical contacts in a mechanical contactor.

BACKGROUND

A mechanical contactor is a switching device normally intended for performing a high number of switching operations during normal load and overload conditions. The IEC product standard defines a mechanical contactor as a mechanical switching device having only one position of rest, operated otherwise than by hand, capable of making, carrying, and breaking currents under normal circuit conditions including operating overload conditions.

A traditional application is to start, run and stop electrical 3-phase Alternating Current (AC)-motors but there are also lots of other applications. In most of these applications the contactor is expected to have a long durability. However even a contactor can fail, and if that happens it can cause serious problems. Besides the loss of functionality, it can cause safety issues and even fire. It may thus be desirable to monitor the condition of the contactor throughout its life.

DE 10 2008 046 374 relates to an electromagnetic switchgear, e.g. contactor, where the magnetic system has a movable armature which moves towards a yoke when a current through a coil produces an electromagnetic field. A force sensor is arranged below the yoke to detect the impact torque of the armature when the contacts are closed. The measurement signal of the force sensor is used to reduce the energy supplied to the electromagnetic field since less energy is needed to hold the contactor in a closed position than to close it.

SUMMARY

It is an objective of the present invention to provide a way of monitoring the contact force by which the two electrical contacts of a contact pair in a contactor are pressed together when the contactor is in a closed position (i.e., when the contact pair conducts a current).

According to an aspect of the present invention, there is provided a method of monitoring a contact force between a pair of first and second electrical contacts in a mechanical contactor. The contactor comprises the pair of first and second contacts for conducting a mains current when the contactor is in a closed position, and an electromagnet comprising a movable armature mechanically connected to the first contact, a stationary core fastened to a base, and an electrically conductive coil. The electromagnet is arranged to, when the contactor is activated by a control current running through the coil, force the movable armature towards the stationary core and thus press the first contact against the second contact by the contact force after the contactor has reached the closed position. The method comprises receiving, from a force sensor, a signal comprising information about a base force sensed by the force sensor between the stationary core and the base. The method also comprises determining a magnitude of the contact force based on said received information. The method also comprises outputting information based on the determined magnitude to an operator.

According to another aspect of the present invention, there is provided a computer program product comprising computer-executable components for causing a monitoring device to perform an embodiment of the method of the present disclosure when the computer-executable components are run on processing circuitry comprised in the monitoring device.

According to another aspect of the present invention, there is provided a force monitoring device for determining a contact force between first and second contacts of a mechanical contactor. The force monitoring device comprises processing circuitry, and storage storing instructions executable by said processing circuitry whereby said force monitoring device is operative to receive, from a force sensor, a signal comprising information about a base force sensed by the force sensor between a stationary core of the contactor and a base to which the stationary core is fastened. The force monitoring device is also operative to determine a magnitude of the contact force based on said received information. The force monitoring device is also operative to output information based on the determined magnitude to an operator.

According to another aspect of the present invention, there is provided a force detector comprising an embodiment of the force monitoring device of the present disclosure, and the force sensor arranged between the stationary core the base for sensing the base force therebetween.

According to another aspect of the present invention, there is provided a mechanical contactor comprising at least one pair of first and second electrical contacts for conducting a mains current when the contactor is in a closed position. The contactor also comprises an electromagnet comprising a movable armature mechanically connected to the first contact, a stationary core fastened to a base, and an electrically conductive coil. The electromagnet is arranged to, when the contactor is activated by a control current running through the coil, force the movable armature towards the stationary core and thus press the first contact against the second contact by a contact force after the contactor has reached the closed position. The contactor also comprises an embodiment of the force detector of the present disclosure.

The contact force between contacts, i.e. the force with which a first of the contacts is pressed against the second of the contacts, of at least one contact pair in the contactor may indicate a condition of the contactor. For instance, if the contact surfaces of the contacts are worn down, or if the contact spring is worn, the contact force may be reduced over time. Also, e.g. in case of a fault current being conducted by the contact pair, a current spike may result in the contacts repelling each other (by so called Lorenz forces), in which case the contact force may temporarily increase. However, it may be difficult to measure the contact force at the pair of contacts, e.g. because they are typically at high electrical potential.

By instead sensing a base force between the stationary core (typically at low electrical potential) of the electromagnet of the contactor and the base, and then determining the contact force based on information about this sensed base force, there is no need to perform measurements directly at high potential. Additionally, or alternatively, to determine the contact force based on the sensed base force may more generally be an alternative to sensing the contact force directly.

It is to be noted that any feature of any of the aspects may be applied to any other aspect, wherever appropriate. Likewise, any advantage of any of the aspects may apply to any of the other aspects. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

BRIEF DESCRIPTION OF THE DRAWINGS

Embodiments will be described, by way of example, with reference to the accompanying drawings, in which.

DETAILED DESCRIPTION

Embodiments will now be described more fully hereinafter with reference to the accompanying drawings, in which certain embodiments are shown. However, other embodiments in many different forms are possible within the scope of the present disclosure. Rather, the following embodiments are provided by way of example so that this disclosure will be thorough and complete, and will fully convey the scope of the disclosure to those skilled in the art. Like numbers refer to like elements throughout the description.

Figure 1:
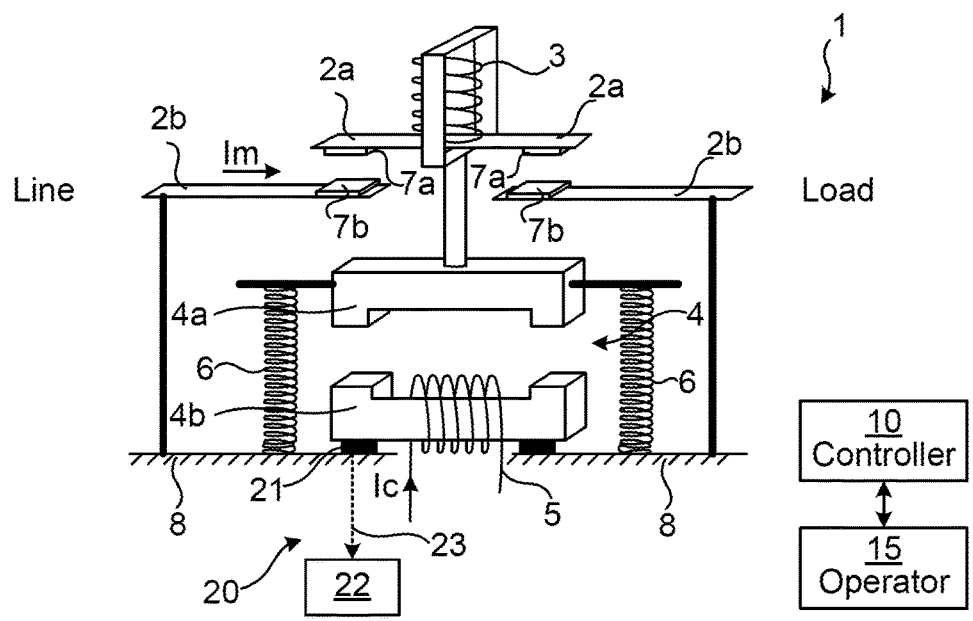
FIG. 1 is a schematic perspective view of a contactor in accordance with some embodiments of the present invention.

FIG. 1 illustrates a contactor 1 arranged to make, carry and break a main current Im, e.g. between a line and a load. The contactor comprises at least one pair of contacts 2, each pair consisting of a first (movable) contact 2a and a second (stationary) contact 2b, which make the main current Im when brought in contact with each other (closing the contactor, i.e. bringing the contactor from an open position to a closed position), carry the main current when maintained in contact with each other (maintaining the contactor in the closed position), and breaking the main current when separated from each other (opening the contactor, i.e. bringing it from the closed position to the open position). In the embodiment of FIG. 1, the contactor comprises two contact pairs in series, each contact 2 (first contact 2a or second contact 2b) having a contact surface 7 (first contact surface 7a or second contact surface 7b, respectively) for making contact with the other contact of its pair. The contact surfaces 7 may be provided an electrically conductive material attached to the other electrically conductive material of the rest of the contacts 2.

FIG. 1 illustrates a single-phase contactor 1. However, a corresponding contactor may be designed for any number of phases, e.g. with one or two contact pairs per phase. In case of a three-phase contactor, two contact pairs in series (as in FIG. 1) may be arranged for each phase, for a total of six contact pairs, typically all of which are operated by a single electromagnet 4.

For operation, the contactor 1 comprises an electromagnet 4 functioning as an actuator for closing the contactor, maintaining the contactor in the closed position, and opening the contactor, respectively. The electromagnet 4 comprises a movable armature 4a which is mechanically connected to the first contact 2a, a stationary core 4b fastened to the base 8, and a coil 5, e.g. wound around the a part of the electromagnet 4, for instance around the stationary core 4b, as in the figure, arranged to carry a control current Ic. When no control current Ic is flowing through the coil 5, there is no magnetic attraction between the core 4b and the armature 4a, why the armature is held away from the core by means of the separation spring(s) 6 arranged between the armature 4a and the base 8, and the first and second contacts 2a and 2b are held separated from each other, i.e. the contactor is in its open position. As schematically illustrated in the figure, the stationary contact(s) 2b is mechanically connected to the base 8 and thus held immovable/stationary in relation to the base. When the control current Ic is turned on and thus flowing through the coil 5, the coil and thus the electromagnet 4 is magnetized whereby the armature 4a is pulled magnetically towards the core 4b, bringing the first (movable) contact 2a in contact with the second (stationary) contact 2b and thus bringing the contactor from its open position to its closed position. While the control current Ic is flowing, the contactor remains in the closed position. Optionally, a contact spring 3 is used to evenly press the contacts 2a and 2b against each other while the contactor in the closed position. When the control current Ic is turned off, i.e. not flowing through the coil 5, the coil 5 (and thus the electromagnet 4) is demagnetized, the armature 4a is pushed away from the core 4b by means of the separation spring(s) 6 and/or the contact spring 3, the contacts 2a and 2b are separated from each other and the contactor is thus brought from its closed position to its open position.

The contactor also comprises a controller 10, arranged to control the control current Ic, including turning the control current on and off as desired, by means of control signals. The controller 10 may also interact with an operator 15 of the contactor, e.g. a human operator and/or an operating system. The controller may e.g., provide information about the operation of the contactor to the operator, e.g. to a human operator via a user interface such as a display screen and/or light and/or sound indicators.

In accordance with the present invention, a force detector 20 is arranged in the contactor 1 for monitoring the contact force applied from the first contact 2a against the second contact 2b from when the contacts come into contact with each other during closing of the contactor and when the contactor is maintained in its closed position. The force detector 20 comprises a force sensor 21 arranged to sense a base force between the stationary core 4b and the base 8. The base 8 is stationary and may e.g., be any stationary parts of the contactor 1 e.g., arranged relative to a floor, wall or ground on which the contactor 1 is arranged. The force detector 20 also comprises a force monitoring device 22, arranged for determining the contact force between the first and second contacts 2a and 2b based on said sensed base force. Information about the sensed base force may be sent as a signal 23 from the sensor 21 to the force monitoring device 22.

The sensor 21 may be any suitable force sensor. Since the sensor 21 is arranged between the base 8 and the core 4b, which is typically not at high electrical potential, the force sensor 21 may be of a relatively simple design and may communicate with the force monitoring device by a regular wired or wireless communication path. In some embodiments, the force sensor 21 is or comprises a piezoelectric sensor, a micro electric mechanic system (MEMS) sensor or a strain gauge sensor. In some embodiments, a piezoelectric sensor may conveniently be used.

Figure 2:
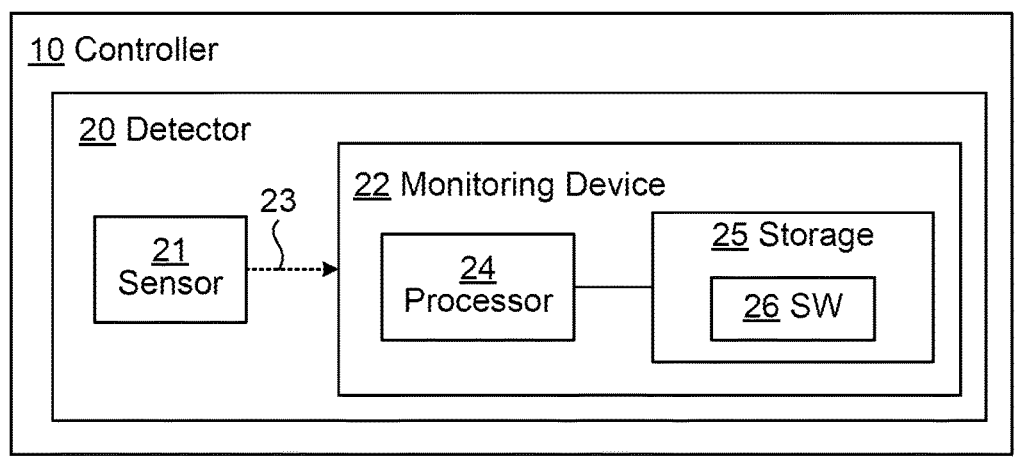
FIG. 2 is a schematic block diagram of force detector, optionally comprised in a controller, in accordance with some embodiments of the present invention.

FIG. 2 schematically illustrates an embodiment of the force detector 20 of the present disclosure. The force detector may be separate from the contactor controller 10, but it may be convenient, in some embodiments, to include the detector 20 in the controller 10, as illustrated in the figure. The force detector 20 comprises the force sensor 21 and the monitoring device 22 which is arranged to receive a signal 23 comprising information about the base force sensed by the force sensor 21. The monitoring device 22, and thus the force detector 20 (and in the embodiment of FIG. 2 also the controller 10), comprises processing circuitry 24 e.g., a central processing unit (CPU). The processing circuitry 24 may comprise one or a plurality of processing units in the form of microprocessor(s). However, other suitable devices with computing capabilities could be comprised in the processing circuitry 11, e.g., an application specific integrated circuit (ASIC), a field programmable gate array (FPGA) or a complex programmable logic device (CPLD). The processing circuitry 24 is configured to run one or several computer program(s) or software (SW) 26 stored in a data storage 25 of one or several storage unit(s) e.g., a memory. The storage unit is regarded as a computer readable means 25, forming a computer program product together with the SW 26 stored thereon as computer-executable components, as discussed herein and may e.g., be in the form of a Random-Access Memory (RAM), a Flash memory or other solid-state memory, or a hard disk, or be a combination thereof. The processing circuitry 24 may also be configured to store data in the storage 25, as needed.

The monitoring device 22 may be arranged for performing the method of monitoring the contact force, in accordance with some embodiments of the present disclosure.

Figure 3:
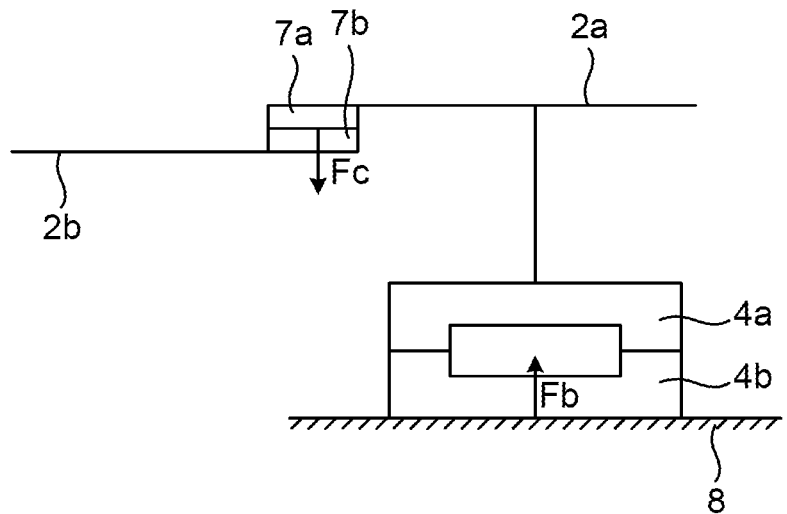
FIG. 3 is a simplified schematic side view of a contactor in its closed position, in accordance with some embodiments of the present invention.

FIG. 3 illustrates the contactor 1 when maintained in its closed position, i.e. when the first and second contacts 2a and 2b are in electrical contact with each other and conducts the mains current Im. If a contact spring 3, as in FIG. 1, or the like is used, the first and second contacts 2a and 2b may be brought into electrical contact with each other during closing of the contactor before the movable armature 4a reaches its end position, e.g. when coming into mechanical contact with the stationary core 4b or with a stopper or the like. The contact force Fc may thus increase during closing of the contactor while the contact spring 3 is charged (e.g., compressed), but when the movable armature 4a has reached its end position, i.e. no longer moving towards the core 4b, the contact force Fc may be expected to be constant while the contactor is maintained in its closed position.

The contact force Fc is herein defined as the force exerted from the first (movable) contact 2a, typically at its contact surface 7a, against the second (stationary) contact 2b, typically at its contact surface 7b, when the movable armature 4a is pulled towards/against the core 4b when the control current Ic runs through the coil 5. In the embodiment of FIG. 3, the contact force Fc is thus directed downward, towards the base 8. It follows that a counter force is exerted from the second contact against the first contact, but there is also a base force Fb between the core 4b and the base 8 as the core 4b is pulled towards the movable armature 4a (upwards in FIG. 3). This base force Fb depends on the contact force Fc, and (if this dependence is known or estimated) the contact force Fc can be determined by the force monitoring device 22 based on the based force Fb as sensed by the force sensor 21. Since the direction of the contact force Fc is obvious from the design of the contactor 1, it is the magnitude of the contact force Fc which is of interest to determine (e.g., measure or calculate, or receive from the sensor 21).

Depending on how the sensor 21 is arranged between the core 4b and the base 8, the base force Fb may be directed in the opposite or same direction as the contact force Fc. In the example of FIG. 3, the base force Fb has the opposite direction to the contact force Fc. When determining the magnitude of the contact force Fc, e.g. by the force monitoring device 22, also the direction of the contact force may be determined. However, this direction may already be obvious from the design of the contactor 1.

In an ideal system, the base force Fb may have the same magnitude as the contact force Fc, but in reality, there will usually be losses due to e.g., friction between the core 4b and the contacts 2a and 2b, why the base force Fb may be larger than the resulting contact force Fc. The contact force Fc may be determined as a function of the sensed base force Fb, e.g. by a predetermined offset or correlation.

As mentioned above, the contact force Fc may give an indication of the condition of the contactor. For instance, the contact surfaces 7a and 7b may each be worn over time, e.g. by several millimetres, such as within the range of 1-3 mm, which may result in a detectable reduced contact force Fc. A reduced contact force Fc may result in reduced conductivity over the pair of contacts 2a and 2b when the contactor 1 is in its closed position, possibly leading to accelerated wear of the contact surfaces 7a and 7b.

Figure 4:
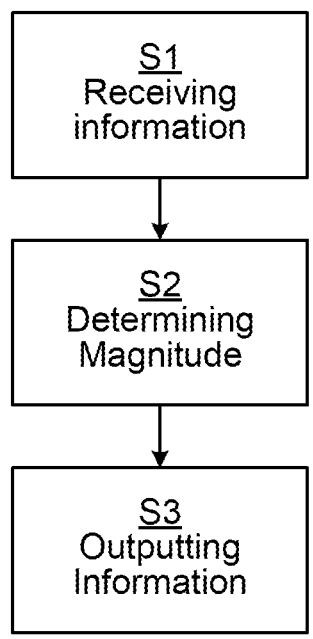
FIG. 4 is a schematic flow chart of a method, in accordance with some embodiments of the present invention.

FIG. 4 is a flow chart illustrating some embodiments of the method of the present invention. The method is for monitoring the contact force Fc between a pair of first and second electrical contacts 2a and 2b in a mechanical contactor 1. The method may be performed in a force detector 20, e.g. by a force monitoring device 22 thereof. The method comprises receiving S1, from a force sensor 21, a signal 23 comprising information about a base force Fb sensed by the force sensor between the stationary core 4b and the base 8. The information may e.g., comprise the magnitude of the sensed contact force Fc or other information which allows the force monitoring device 22 to determine (e.g., calculate) the magnitude of the contact force Fc. Then, the magnitude of the contact force Fc is determined S2 based on the information received S1 from the force sensor 21. Then, information based on the determined S2 magnitude, e.g. including the determined S2 magnitude, is outputted S3 to an operator of the force monitoring device 22 or of the force detector 20. The operator may be the operator 15 of the contactor 1, or another operator e.g., a monitoring system or control system.

The base force Fb is typically sensed, e.g. continuously or periodically, while the contactor is maintained in its closed position (e.g., while the movable armature 4a is held immovable at its end position, e.g. against the core 4b), and the signal 23 may be sent by the sensor 21 and received by the force monitoring device 22 during this time. Thus, the contact force Fc may not be detected, or not only be detected, during closing of the contactor but while the contactor is maintained in its closed position. Thus, the receiving S1 may comprise continuously or periodically receiving the signal 23 while the contactor 1 is in the closed position, and/or the determining S2 may comprise continuously or periodically determining the magnitude of the contact force Fc based on the received S1 information, and/or the outputting S3 may comprise continuously, or periodically outputting information based on the determined S2 magnitude to the operator 15.

Similarly, the received S1 information may be about the base force Fb sensed continuously or periodically by the sensor 21. Additionally, or alternatively, in some embodiments, the received S1 information is about the sensed base force Fb in real-time, i.e. the received S1 information may update the force modifying device 22 about the sensed base force in real-time. Additionally, or alternatively, the received S1 information may comprise the magnitude, and optionally the direction, of the base force Fb.

The present disclosure has mainly been described above with reference to a few embodiments. However, as is readily appreciated by a person skilled in the art, other embodiments than the ones disclosed above are equally possible within the scope of the present disclosure, as defined by the appended claims.

The invention claimed is:

1. A method of monitoring a contact force between a pair of first and second electrical contacts in a mechanical contactor, the contactor having:
the pair of first and second contacts for conducting a mains current when the contactor is in a closed position; and
an electromagnet having:
a movable armature mechanically connected to the first contact,
a stationary core fastened to a base, and
an electrically conductive coil wound around the movable armature or the stationary core,
wherein the electromagnet is arranged to, when the contactor is activated by a control current running through the coil, force the movable armature towards the stationary core and thus press the first contact against the second contact by the contact force after the contactor has reached the closed position;
the method comprising:
receiving, from a force sensor, a signal having information about a base force sensed by the force sensor between the stationary core and the base when the contactor is in the closed position;
determining a magnitude of the contact force based on said received information; and
outputting information based on the determined magnitude to an operator.

2. The method of claim 1, wherein the determining step further comprises determining the magnitude as a function of the magnitude of the base force.

3. The method of claim 2, wherein the determining step further comprises determining that the contact force has an opposite direction to the base force.

4. The method of claim 2, wherein the receiving step further comprises continuously or periodically receiving the signal while the contactor is in the closed position.

5. The method of claim 2, wherein the received information is about the base force sensed continuously or periodically.

6. The method of claim 2, wherein the received information is about the sensed base force in real-time.

7. The method of claim 2, wherein the received information further comprises the magnitude, and optionally the direction, of the base force.

8. The method of claim 1, wherein the determining step further comprises determining that the contact force has an opposite direction to the base force.

9. The method of claim 1, wherein the receiving step further comprises continuously or periodically receiving the signal while the contactor is in the closed position.

10. The method of claim 1, wherein the received information is about the base force sensed continuously or periodically.

11. The method of claim 1, wherein the received information is about the sensed base force in real-time.

12. The method of claim 1, wherein the received information further comprises the magnitude, and optionally the direction, of the base force.

13. A computer program product comprising computer-executable components for causing a monitoring device to perform a method when the computer-executable components are run on processing circuitry included in the monitoring device, wherein the method enables monitoring a contact force between a pair of first and second electrical contacts in a mechanical contactor, the contactor having:
the pair of first and second contacts for conducting a mains current when the contactor is in a closed position; and
an electromagnet having:
a movable armature mechanically connected to the first contact,
a stationary core fastened to a base, and
an electrically conductive coil wound around the movable armature or the stationary core,
wherein the electromagnet is arranged to, when the contactor is activated by a control current running through the coil, force the movable armature towards the stationary core and thus press the first contact against the second contact by the contact force after the contactor has reached the closed position;
the method including:
receiving, from a force sensor, a signal including information about a base force sensed by the force sensor between the stationary core and the base when the contactor is in the closed position;
determining a magnitude of the contact force based on said received information; and
outputting information based on the determined magnitude to an operator.

14. A force monitoring device for determining a contact force between a pair of first and second contacts in a mechanical contactor, the contactor having:
the pair of first and second contacts for conducting a mains current when the contactor is in a closed position; and
an electromagnet having:
a movable armature mechanically connected to the first contact,
a stationary core fastened to a base, and
an electrically conductive coil wound around the movable armature or the stationary core,
wherein the electromagnet is arranged to, when the contactor is activated by a control current running through the coil, force the movable armature towards the stationary core and thus press the first contact against the second contact by the contact force after the contactor has reached the closed position;
the force monitoring device comprising:
processing circuitry; and
storage storing instructions executable by said processing circuitry whereby said force monitoring device is operative to:
receive, from a force sensor, a signal including information about a base force sensed by the force sensor between the stationary core and the base when the contactor is in the closed position;

determine a magnitude of the contact force based on said received information; and output information based on the determined magnitude to an operator.

15. A force detector comprising:

a force monitoring device for determining a contact force between a pair of first and second contacts in a mechanical contactor, the contactor having:

the pair of first and second contacts for conducting a mains current when the contactor is in a closed position; and an electromagnet having:
a movable armature mechanically connected to the first contact,
a stationary core fastened to a base, and
an electrically conductive coil wound around the movable armature or the stationary core, wherein the electromagnet is arranged to, when the contactor is activated by a control current running through the coil, force the movable armature towards the stationary core and thus press the first contact against the second contact by the contact force after the contactor has reached the closed position;

the force monitoring device having:
processing circuitry; and
storage storing instructions executable by said processing circuitry whereby said force monitoring device is operative to:
receive, from a force sensor, a signal including information about a base force sensed by the force sensor between the stationary core and the base when the contactor is in the closed position;
determine a magnitude of the contact force based on said received information;
output information based on the determined magnitude to an operator; and
the force sensor arranged between the stationary core and the base for sensing the base force therebetween.

16. The force detector of claim 15, wherein the force sensor is a piezoelectric, a micro electric mechanic system, MEMS, or a strain gauge sensor, e.g. a piezoelectric sensor.

17. A mechanical contactor comprising:

at least one pair of first and second electrical contacts for conducting a mains current when the contactor is in a closed position;

an electromagnet having:
a movable armature mechanically connected to the first contact,
a stationary core fastened to a base, and
an electrically conductive coil wound around the movable armature or the stationary core, wherein the electromagnet is arranged to, when the contactor is activated by a control current running through the coil, force the movable armature towards the stationary core and thus press the first contact against the second contact by a contact force after the contactor has reached the closed position; and a force detector having:
a force monitoring device for determining the contact force between first and second contacts, the force monitoring device having:
processing circuitry; and
storage storing instructions executable by said processing circuitry whereby said force monitoring device is operative to:
receive, from a force sensor, a signal including information about a base force sensed by the force sensor between the stationary core and the base when the contactor is in the closed position;
determine a magnitude of the contact force based on said received information;
output information based on the determined magnitude to an operator; and
the force sensor arranged between the stationary core and the base for sensing the base force therebetween.

* * * * *